(12) United States Patent
Ladouceur et al.

(10) Patent No.: US 7,152,297 B2
(45) Date of Patent: Dec. 26, 2006

(54) SELF-ATTACHING FEMALE FASTENER, DIE SET AND METHOD OF ATTACHMENT

(75) Inventors: Harold A. Ladouceur, Livonia, MI (US); John J. Vrana, Rochester Hills, MI (US)

(73) Assignee: Whitesell International Corporation, Muscle Shoals, AL (US)

( * ) Notice: Subject to any disclaimer, the term of this patent is extended or adjusted under 35 U.S.C. 154(b) by 157 days.

(21) Appl. No.: 10/858,622

(22) Filed: Jun. 2, 2004

(65) Prior Publication Data

US 2005/0271495 A1 Dec. 8, 2005

(51) Int. Cl.
*B21D 39/00* (2006.01)

(52) U.S. Cl. ................. 29/505; 29/432.2; 411/179; 411/180

(58) Field of Classification Search ........ 411/179–181; 29/432–432.2, 521, 524.1, 505
See application file for complete search history.

(56) References Cited

U.S. PATENT DOCUMENTS

| | | | |
|---|---|---|---|
| 3,299,500 A | * | 1/1967 | Double ................. 29/432.2 |
| 3,711,931 A | | 1/1973 | Ladouceur et al. |
| 3,810,291 A | | 5/1974 | Ladouceur |
| 3,878,599 A | | 4/1975 | Ladouceur et al. |
| 4,484,385 A | * | 11/1984 | Woods ................. 29/432.2 |
| 4,971,499 A | | 11/1990 | Ladouceur |
| 5,549,430 A | | 8/1996 | Takahashi et al. |
| 6,631,827 B1 | | 10/2003 | Goodsmith et al. |

* cited by examiner

*Primary Examiner*—David P. Bryant
*Assistant Examiner*—Christopher M. Koehler
(74) *Attorney, Agent, or Firm*—Howard & Howard Attorneys, P.C.

(57) ABSTRACT

A self-attaching fastener for thick panels having a pilot and a groove in a flange portion including an inclined outer wall and a bottom wall having an inclined portion extending to the outer face of the pilot and a concave surface in the outer face of the pilot adjacent the bottom wall. A die set for various panel thicknesses each having a projecting lip including an end face and first and second inclined faces which deform the panel against the inclined bottom wall and beneath the concave surface of the pilot. And, a method of attaching the fastener to a metal panel, wherein the die lip deforms a panel against the inclined bottom wall portion adjacent the pilot portion, inwardly into the concave surface and outwardly beneath the groove outer wall.

6 Claims, 6 Drawing Sheets

SELF-ATTACHING FEMALE FASTENER, DIE SET AND METHOD OF ATTACHMENT

FIELD OF THE INVENTION

This invention relates to a self-attaching female fastener, such as a pierce nut, for attachment to a thick or heavy metal panel, a die button or die set and a method of attaching a self-attaching female fastener to a panel.

BACKGROUND OF THE INVENTION

Self-attaching female fasteners, including pierce and clinch nuts, are limited in application by a range of panel thicknesses. A self-attaching nut typically includes a projecting pilot portion and a flange portion on at least opposed sides of the pilot portion having a generally planar panel support face generally parallel to the end face of the pilot portion and a groove in the panel support face of the flange portion adjacent the pilot portion. The self-attaching nut may be utilized as a pierce nut, wherein the panel is supported on a die member in a die press having a projecting piercing or clinching lip configured to be received in the groove in the panel support face of the flange portion and the projecting pilot portion is driven against the panel, piercing an opening in the panel, which receives the pilot portion therethrough, and the projecting piercing lip then drives a panel portion adjacent the panel opening into the groove of the pierce nut, forming a mechanical interlock between the panel and the pierce nut permanently attaching the pierce nut to the panel. The self-attaching female fastener or nut may also be utilized as a clinch nut, wherein a panel opening configured to receive the pilot portion is preformed in the panel and the clinching nut of the die button deforms the panel into the groove in the same manner as a pierce nut.

A self-attaching female fastener may be formed in a rolling process, wherein steel rod is rolled into the desired cross-sectional configuration of the self-attaching female fastener, cut to length and pierced through the pilot portion forming a bore and the bore may be tapped to form a female thread depending upon the application. Alternatively, the bore may be smooth to receive a thread forming or thread rolling male fastener. As will be understood by those skilled in this art, a rolled self-attaching female fastener or nut will have a generally rectangular configuration, as disclosed for example in U.S. Pat. No. 4,971,499 assigned to the predecessor in interest of this application, wherein the pilot portion includes a rectangular end face, the flange portions are on opposed sides of the pilot portion each having a rectangular panel support face and the grooves are linear. In the self-attaching female fastener disclosed in U.S. Pat. No. 4,971,499, the grooves are formed in the panel support faces of the flange portions adjacent the pilot portion and the grooves include a bottom wall parallel to the end face of the pilot portion and the panel support faces of the flange portion, the outer groove wall is inclined toward the pilot portion and the inner groove wall is inclined outwardly toward the flange portion forming a "re-entrant groove."

The back face of the self-attaching female fastener may also include linear wire grooves which receive linear frangible connector elements as disclosed in U.S. Pat. No. 3,711,931, also assigned to the predecessor in interest of the assignee of this application. The self-attaching nut disclosed in this patent is generally T-shaped in cross-section, wherein the grooves are formed in the side faces of the pilot portion. Self-attaching female fasteners may also be formed by cold header techniques, wherein the self-attaching female fastener is generally round, the flange portion typically surrounds the pilot portion and the groove is formed in the panel support face of the flange portion adjacent to and surrounding the pilot portion as disclosed, for example, in U.S. Pat. Nos. 3,810,291 and 3,878,599 assigned to the predecessor in interest of the assignee of this application. The self-attaching female fastener of this invention is preferably a rolled self-attaching female fastener of the type disclosed in the above-referenced U.S. Pat. No. 4,971,499. However, the self-attaching female fastener of this invention may also be formed by cold header techniques, wherein the flange portion surrounds the pilot portion as described above.

As set forth above, the applications for a self-attaching female fastener of the type disclosed herein are limited by the range of panel thicknesses. For example, a pierce nut of the type disclosed in the above-referenced U.S. Pat. No. 4,971,499 having an 8 mm diameter bore is 0.64 to 1.65 mm and a maximum panel thickness for the largest self-attaching female fastener of this type is 2.79 mm. If the self-attaching fastener is installed in a metal panel having a thickness of greater than 2.79 mm, there is little or no retention of the fastener to the panel and the thread cylinder is deformed or collapses during the installation. As used herein, the term "thread cylinder" refers to the bore of the fastener, whether or not the bore is internally threaded. There is, therefore, a long felt need for a female self-attaching fastener which may be installed in a thick or heavy metal panel having a thickness greater than 2.79 mm for many applications, particularly including automotive applications.

SUMMARY OF THE INVENTION

As set forth above, the self-attaching female fastener or nut of this invention is particularly, but not exclusively, for attachment to heavy metal panels having a thickness greater than 2.79 mm, wherein the installation of the self-attaching female fastener has good retention to the metal panel and the installation of the self-attaching female fastener does not result in deformation or collapse of the thread cylinder. The self-attaching female fastener of this invention may be attached to metal panels having a thickness as great as 4.5 mm, depending upon the size of the fastener, significantly increasing the applications for self-attaching female fasteners.

The self-attaching female fastener or nut of this invention includes a central pilot portion having a generally planar end face and a bore through the end face, a flange portion on opposed sides of the pilot portion having a generally planar panel support face, preferably parallel to the end face of the pilot portion, and a groove in the panel support face of the flange portion adjacent the pilot portion. As set forth above, the bore may be internally threaded or cylindrical to receive a thread forming or thread rolling male fastener, such as a screw or bolt. Although the preferred embodiment of the self-attaching female fastener of this invention is formed by rolling, as described above, the self-attaching female fastener of this invention may also be formed by cold header techniques, wherein the flange portion surrounds the pilot portion and the groove is adjacent to and surrounds the pilot portion.

The groove in the panel support face of the flange portion adjacent the pilot portion includes an inner side wall defining an outer face or outer side wall of the pilot portion which extends generally perpendicular to the end face of the pilot portion from the end face, a bottom wall and an outer side wall inclined from adjacent the bottom wall toward the pilot portion, thus defining a restricted opening to the groove at the panel support face of the flange portion. The bottom wall of the groove includes a first bottom wall portion adjacent the outer side wall of the groove extending generally parallel to the panel support face and a second bottom wall portion inclined upwardly from the first bottom wall portion toward the inner side wall of the groove or the outer face of the pilot portion, preferably at an angle of between 10 and 30 degrees, more preferably between 15 and 25 degrees or preferably about 20 degrees. As set forth below, the inclined second bottom wall portion prevents collapse of the thread cylinder during installation of the self-attaching female fastener of this invention to a heavy metal panel and provides improved retention of the self-attaching female fastener on a panel, particularly for heavy metal applications. Where the self-attaching female fastener of this invention is installed in a heavy metal panel, the inner side wall of the groove or outer face of the pilot portion preferably joins the end face of the pilot portion in an arcuate surface, preferably having a maximum radius of 0.015 mm.

As set forth above, the outer face of the pilot portion preferably extends generally perpendicular to the end face of the pilot portion from the end face. In a preferred embodiment, the outer face of the pilot portion extends perpendicular from the end face to adjacent the second bottom wall portion of the groove and the inner side wall of the groove includes a small undercut adjacent the second bottom wall portion which, in a preferred embodiment, includes a concave or indented arcuate surface having a radius of approximately 0.1 mm, wherein the outer face of the pilot portion extends perpendicular to the end face about two-thirds the height of the outer face of the pilot portion, measured from the end face to the second bottom wall portion. The outer face of the pilot portion preferably also includes an outwardly inclined portion blending into the concave arcuate portion. The combination of the concave arcuate portion and the inclined second bottom wall portion also reduces the likelihood of damage or deformation of the thread cylinder during installation of the self-attaching female fastener of this invention in a panel. In a preferred embodiment, the second bottom wall portion has a width measured between the inner and outer side walls of the groove generally equal to the width of the first bottom wall portion, although the relative widths of the first and second bottom wall portions may be varied in certain applications. Further, in a preferred embodiment, the first and second bottom wall portions are joined by an arcuate surface.

As set forth above, a preferred embodiment of the self-attaching female fastener of this invention is formed by a rolling process, wherein the desired cross-section of the self-attaching female fastener is rolled from steel bar stock. The bore is then pierced through the pilot portion and the rolled section is then cut to length. Thus, in one preferred embodiment of the self-attaching female fastener of this invention, the fastener includes linear grooves on opposed sides of the pilot portion and the inner and outer side walls and the first and second bottom walls of the groove are generally planar. However, as set forth above, the self-attaching female fastener of this invention may also be formed by cold header techniques, wherein the flange portion surrounds the pilot portion and the groove in the panel support face adjacent the pilot portion may also surround the pilot portion. As will be understood, however, the groove will be on both sides of the pilot portion in a self-attaching female fastener formed by cold header techniques, where the groove surrounds the pilot portion. The method of attaching the self-attaching female fastener of this invention to a panel may be performed in a die press, as described above, wherein the upper die shoe or platen includes a nut installation head having a nut feed passage, which receives the nuts for installation in a panel, a transverse plunger passage and a plunger reciprocating through the plunger passage to install nuts in a panel located opposite the plunger passage as disclosed, for example, in U.S. Pat. No. 6,631,827 assigned to the assignee of this application. The self-attaching female fasteners may be fed to the installation head either in bulk form or the self-attaching female fasteners may be interconnected in a continuous strip as disclosed, for example, in the above-referenced U.S. Pat. No. 3,711,931. The pierce nuts are received in the plunger passage with the end face of the pilot portion opposite the panel.

In a typical application, a die member or die button is located in the lower die shoe or die platen of the die press and a metal panel is supported or affixed to the lower die platen overlying the die button. The die button includes a projecting lip, sometimes referred to as a piercing lip adjacent an opening configured to receive the pilot portion of the self-attaching female fastener. Where the self-attaching female fastener of this invention is formed by rolling, as described above, and the grooves in the panel support face are linear, the die button includes two piercing lips and preferably includes transverse clinching or "spanking" lips. However, the clinching lips may be conventional and do not perform part of this invention.

A preferred embodiment of the die member for attaching the self-attaching female fastener of this invention to a metal panel includes a body portion having a back face, an opening through the body portion through the back face configured to receive the pilot portion of the self-attaching female fastener of this invention and a lip projecting from the back face having an inner surface defining an outer surface of the opening through the body portion.

A preferred embodiment of the projecting lip, sometimes referred to as the piercing lip, includes an end face generally perpendicular to an axis of the opening or the back face, a first inclined face inclined outwardly from the end face toward the back face at a first angle relative to the end face and a second inclined face inclined outwardly from the first inclined face toward the back face at a second angle relative to the end face greater than the first angle. Where the self-attaching female fastener is rectangular and the grooves in the panel support faces adjacent the pilot portion are linear, as described above, the die member includes two projecting piercing lips on the back face of the die member and the opening through the die member is rectangular to receive a rectangular pilot portion of the self-attaching female fastener. However, as described above, the die member of this invention may also be utilized to attach a self-attaching female fastener formed by cold header techniques, wherein the pilot portion may be generally cylindrical or oval-shaped, wherein the projecting lip of the die member is annular and configured to receive the pilot portion as described. Where the die member of this invention is utilized to attach a rolled rectangular self-attaching female fastener, the die member may also include clinching or "spanking" lips on opposed sides of the piercing lips described above, whether or not the die member is utilized to attach a pierce or clinch nut.

In one preferred embodiment of the die member of this invention, the second inclined surface of the projecting lip or lips joins the back face of the die member in an arcuate surface. In a preferred embodiment of the die member of this invention, the first angle of the first inclined face is between 20 and 50 degrees and the second angle of the second inclined face is preferably between 60 and 80 degrees. As will be understood from the above description, where the die member of this invention is utilized to attach a rectangular self-attaching female fastener and the die member includes two piercing lips, the first and second inclined faces are preferably planar. However, the preferred angle of the first inclined face or first angle will depend upon the thickness of the metal panel to which the self-attaching female fastener of this invention is attached. Where the metal panel has a thickness of between about 1.2 mm to 3.5 mm, the first angle is preferably between about 20 degrees and 30 degrees. Where the panel thickness is between about 1.7 mm and 4.5 mm, the second angle is preferably between 60 and 80 degrees. In both embodiments, the second angle is between about 60 degrees and 80 degrees, or more preferably about 70 degrees and the projecting lip is preferably wider for thinner panels and narrower for thicker panels. Thus, this invention includes a die set having a plurality of die members for attaching the self-attaching female fastener of this invention to metal panels having a range of thicknesses from about 1.2 mm to 4.5 mm depending upon the thickness of the metal panel to which the self-attaching female fastener of this invention is attached. The method of installing a pierce nut of this invention thus includes locating the end face of the pilot portion opposite a panel supported on a projecting lip of a die member, as described above, wherein the pilot portion is aligned with the opening through the die member, driving the end face of the pilot portion against the panel, thereby piercing an opening through the panel. The method of this invention then includes driving the end face and the first inclined face of the projecting lip of the die button against a panel portion adjacent the opening through the panel into the groove and against the inclined second bottom wall portion of the groove. Finally, the method of this invention includes deforming the panel portion against the second bottom wall portion, thereby deforming the panel portion outwardly against the first bottom wall portion of the groove and beneath the inclined outer side wall of the groove and preferably inwardly against the outer face of the pilot portion and into the undercut adjacent the inclined second bottom wall portion, forming a mechanical interlock between the self-attaching female fastener and the panel, permanently attaching the fastener to the panel. As set forth above, the self-attaching female fastener of this invention may also be utilized as a clinch nut, wherein the opening in the panel is preformed.

As set forth above, the self-attaching female fastener and method of this invention may be utilized to attach a female fastener to a thick or heavy metal panel having a thickness up to about 4.5 mm or greater, depending upon the size of the female fastener. Where the female fastener has a bore having a diameter of 8 mm, the female fastener may be installed in a panel having a thickness of between 1.50 and 3.50 mm. Where the bore of the female fastener has a diameter of 12 mm, the fastener may be installed in a panel having a thickness of 1.75 to 4.0 mm. However, where the self-attaching female fastener has a bore of 14 or 16 mm, the female fastener may be installed in a panel having a thickness of between 2.0 and 4.5 mm. Thus, the self-attaching female fastener and method of this invention significantly increases the permitted range of panel thicknesses available for installation and has excellent retention or push-off strength without damaging or deforming the thread cylinder. Other advantages and meritorious features of the self-attaching female fastener and method of installation of this invention will be more fully understood from the following description of the preferred embodiments, the appended claims and the drawings, a brief description of which follows.

DESCRIPTION OF THE PREFERRED EMBODIMENTS

Figure 1:
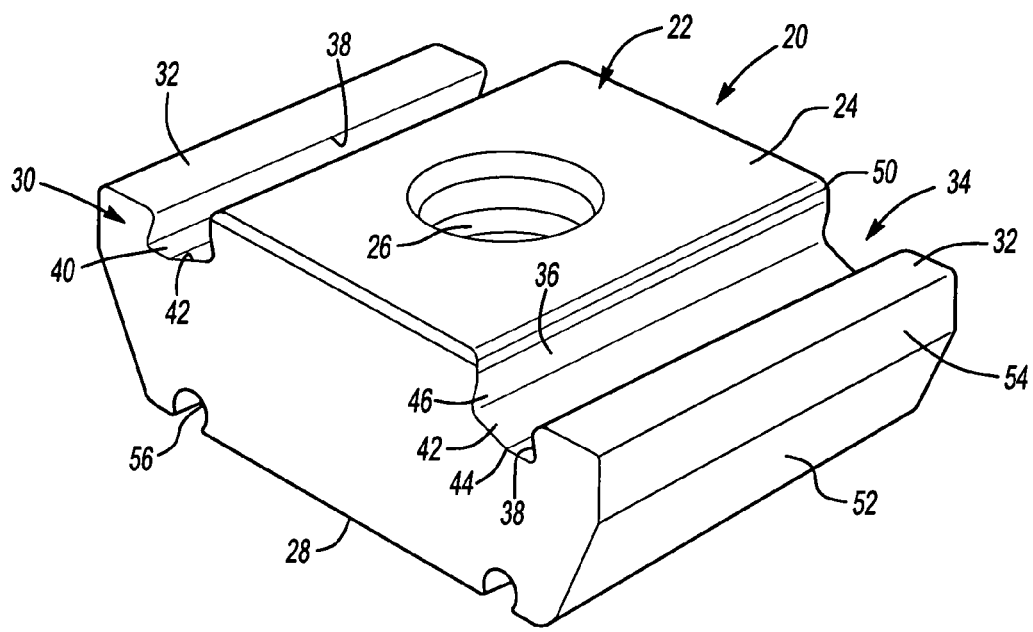
FIG. 1 is a top perspective view of one preferred embodiment of the self-attaching female fastener of this invention.
Figure 2:
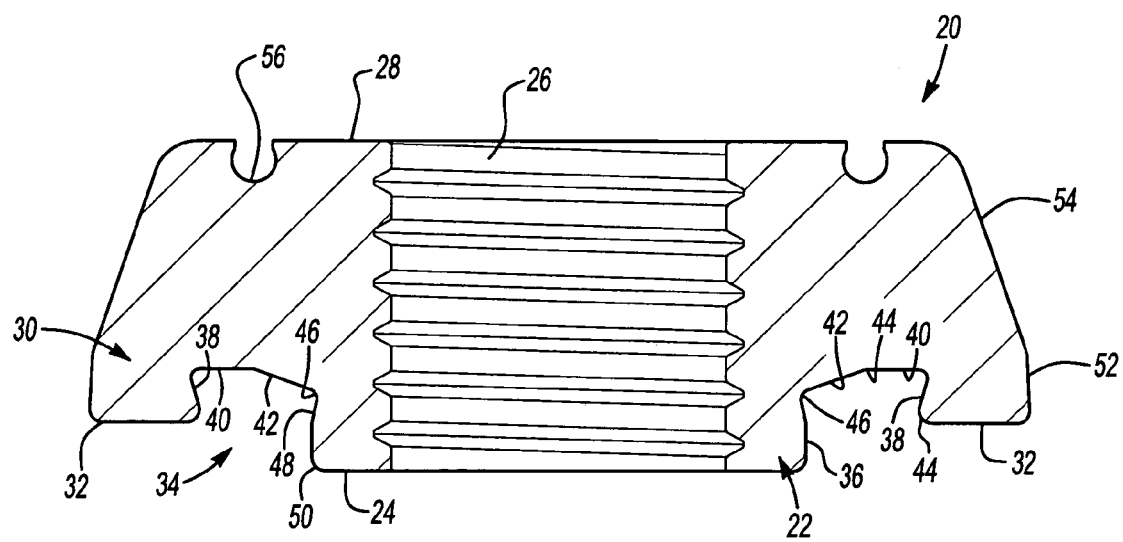
FIG. 2 is a side cross-sectional view of the embodiment of the self-attaching female fastener shown in FIG. 1.

FIGS. 1 and 2 illustrate one preferred embodiment of a self-attaching female fastener 20 of this invention. However, as will be understood, the embodiments of the self-attaching female fastener, die member or die set and method of installation of this invention are for illustrative purposes only and do not restrict this invention except as set forth in the appended claims. As described, a preferred embodiment of the self-attaching female fastener of this invention is formed by rolling steel bar stock, resulting in a generally rectangular self-attaching female fastener 20 as shown. However, the self-attaching female fastener of this invention may also be formed by cold header techniques or progressive die techniques, wherein the shape and configuration of the self-attaching female fastener may be different, including round, octagonal, oval and the like.

The self-attaching female fastener 20 shown in FIGS. 1 and 2 includes a central pilot portion 22 having a planar end face 24, sometimes referred to as the "piercing face," a bore 26 through the end face 24 of the pilot portion 22 and the back face 28, flange portions 30 on opposed sides of the pilot portion 22, each having a planar panel support face 32 and a groove 34 in the panel support face 32 adjacent the pilot portion 22. As set forth above, the disclosed embodiment of the self-attaching female fastener 20 of this invention may be formed by rolling techniques, wherein steel bar is rolled in a rolling mill to the desired cross-section of the self-attaching female fastener as shown in FIG. 2. The bore 26 is then pierced from the nut section, the nut section is then cut to length and the bore 26 may then be tapped or internally threaded, as shown. Alternatively, the bore may remain untapped to receive a thread forming or thread rolling male fastener (not shown). As will be understood by those skilled in this art, a rolled fastener of this type will be generally rectangular in configuration, including a rectangular pilot portion 22 having a rectangular end face 24 and rectangular flange portions 30 each having a rectangular end face 32. However, the self-attaching female fastener of this invention may also be formed by cold forming or cold heading techniques, wherein the pilot portion 22 may be round or oval-shaped, the flange portion 30 may surround or partially surround the pilot portion 22 and the groove 34 may be annular and surround or partially surround the pilot portion 22. In such an embodiment, however, the groove 34 will be located on at least opposed sides of the pilot portion 22. As thus far described, the self-attaching female fastener 20 may be conventional as disclosed, for example, in the above-referenced U.S. Pat. No. 4,971,499. Such self-attaching female fasteners may be utilized either as pierce of clinch nuts. As will be understood by those skilled in this art, when the self-attaching female fastener or nut is utilized as a pierce nut, the end face 24 of the pilot portion pierces an opening in a panel supported on a die member or die button and the panel adjacent the pierced panel opening is deformed into the nut groove or nut grooves permanently attaching the self-attaching female fastener to a panel. Alternatively, the self-attaching female fastener may be utilized as a clinch nut, wherein an opening through the panel configured to receive the pilot portion is preformed or prepierced and the fastener is permanently attached or clinched to the panel by a die member. However, as set forth above, self-attaching female fasteners of the type disclosed in the above-referenced U.S. Pat. No. 4,971,499 are limited to applications where the metal panel has a thickness of less than about 2.80 mm and thus a primary object of this invention is to increase the range of panel thicknesses and thus the applications for the self-attaching female fastener of this invention.

The grooves 34 of the self-attaching female fastener 20 of this invention each include an inner groove wall 36 which defines an outer face of the pilot portion 22 extending generally perpendicular to the end face or piercing face 24 of the pilot portion 22, an inclined outer side wall 38 and a bottom wall including a first bottom wall portion 40 adjacent the inclined outer side wall 38, generally parallel to the panel support face 32 of the flange portions 30, and a second inclined bottom wall portion 42 which is inclined upwardly from the first bottom wall portion 40 to the outer face 36 of the pilot portion as best shown in FIG. 2. In a preferred embodiment, the outer wall 38 of the groove 34 is inclined from the first bottom wall portion 40 toward the inner groove wall or outer face 36 of the pilot portion and joins the end face 32 of the flange portion 38 in an arcuate surface 50. The outer face of the pilot portion 22 or inner face of the groove 36 extends perpendicular to the end face 24 to adjacent the inclined second bottom wall portion 42, as shown in FIG. 2. However, the inner groove wall 36 further includes a concave or indented arcuate surface 46 at the inclined second bottom wall portion 42 and an outwardly inclined surface 48, such that the concave arcuate surface 46 blends into the inclined second bottom wall portion 42 and the outwardly inclined surface 48 blends into the outer face 36 of the pilot portion as shown in FIG. 2. In a preferred embodiment, the outer face 36 of the pilot portion 22 extends perpendicular to the end face 24 at least about 50 percent of the height of the outer face 36 or more preferably about 60 percent of the total height of the outer face 36 of the pilot portion 22, measured from the inclined second bottom wall portion 42 to the end face 24 of the pilot portion 22.

In a preferred embodiment of the self-attaching female fastener 20 of this invention, the width of the first bottom wall portion 40 is preferably about one-half of the bottom wall and the first bottom wall portion 40 joins the second bottom wall portion 42 in an arcuate surface 44. However, in a more preferred embodiment, the inclined second bottom wall portion 42 is slightly wider than the first bottom wall portion 40, as shown in FIG. 2, wherein the width of the second bottom wall portion 42 is between about 5 to 15 percent wider than the first bottom wall portion 40. In a preferred embodiment of the self-attaching female fastener 20 of this invention, particularly for thick or heavy metal applications, the outer face 36 of the pilot portion 22 joins the end face 24 in an arcuate surface 50, as shown.

The side faces of the self-attaching female fastener 20 are adapted to reduce weight and include a first surface 52 extending generally perpendicular to the panel support faces 32 and a second inclined surface 54, which is inclined from the first surface 52 to the back face, as described in U.S. Pat. No. 4,971,499. The back face 28 of the self-attaching female fastener 20 may also include linear wire grooves 56 on opposed sides of the bore 26, preferably opposite the grooves 34, to receive frangible wires for interconnecting a plurality of self-attaching female fasteners in a continuous strip as disclosed, for example, in U.S. Pat. No. 3,711,931 assigned to the predecessor in interest of the assignee of this application. As set forth below, the disclosed embodiment of the self-attaching female fastener 20 of this invention may be utilized either as a pierce or clinch nut and may be attached to a wide range of panel thicknesses, particularly relatively thick metal panels having a thickness of at least about 4.5 mm.

Figure 3:
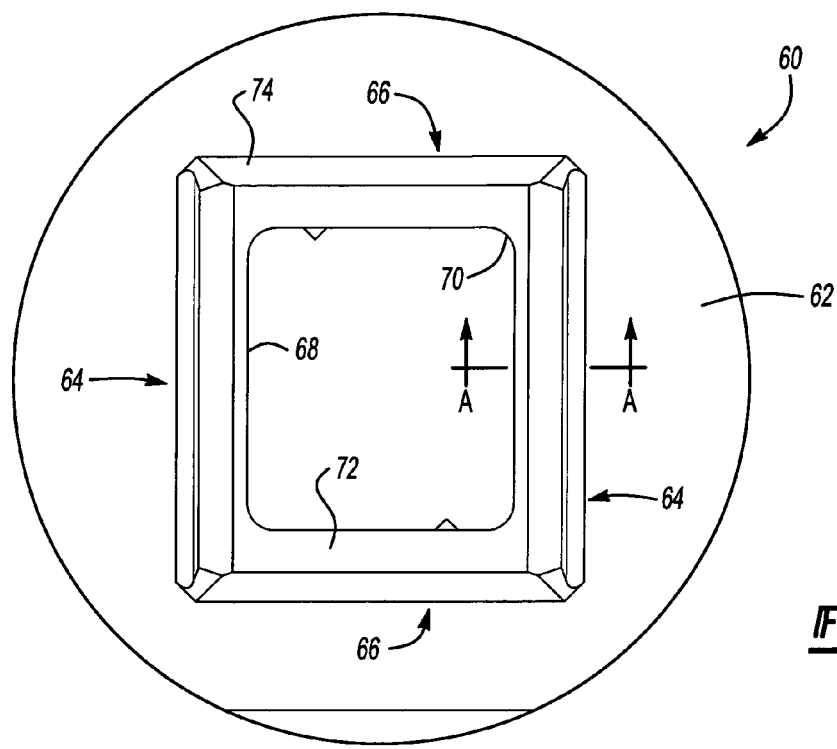
FIG. 3 is a top view of one embodiment of a die member of this invention.
Figure 4:
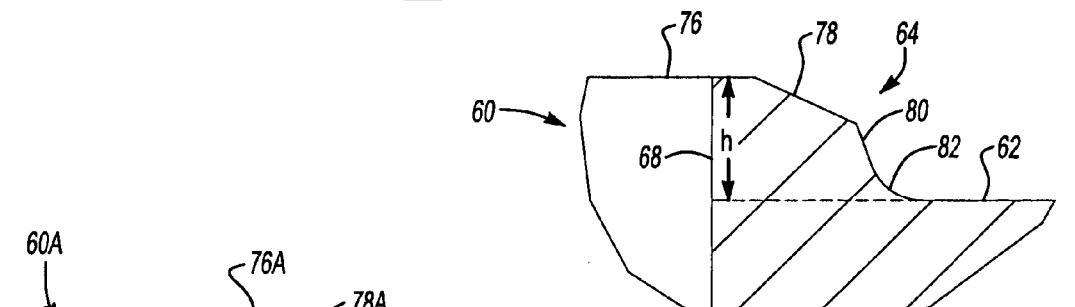
FIG. 4 is a partial side cross-sectional view of FIG. 3 in the direction of view arrows A—A of one embodiment of a die set.
Figure 5:
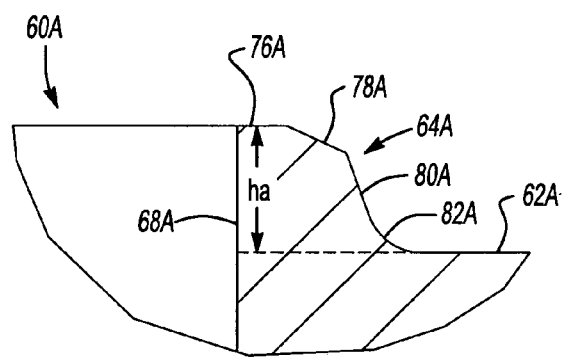
FIG. 5 is a partial side cross-sectional view of FIG. 3 in the direction of view arrows A—A of a second embodiment of a die set.
Figure 6:
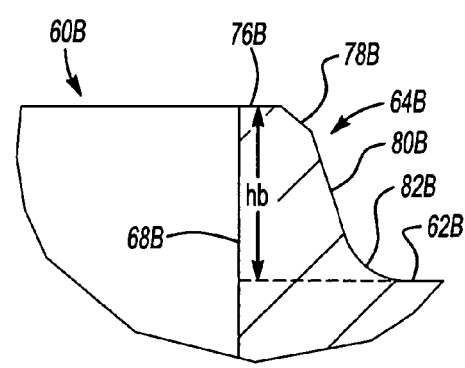
FIG. 6 is a partial side cross-sectional view of FIG. 3 in the direction of view arrows A—A of a third embodiment of a die set.

FIGS. 3 to 6 illustrate embodiments of a die member or die button which, in combination form a die set for attaching the self-attaching female fastener 20 of this invention to metal panels having a wide range of thicknesses. That is, as described further below, FIGS. 3 and 4 illustrate one embodiment of a die button 60 for relatively thinner metal panels, FIG. 5 illustrates the piercing lip of a die member 60A for intermediate panel thicknesses and FIG. 6 illustrates the piercing lip of a die button 60B for thicker metal panels in combination forming a die set for metal panels having a wide range of panel thicknesses. However, all of the embodiments of the die button are similar in configuration, as now described. First, referring to FIG. 3, the die button 60 includes a back face 62 which is preferably planar and polished. In the disclosed embodiment of the die member 60 of this invention, the back face 62 includes parallel linear projecting piercing lips 64 and transverse spanking lips 66 surrounding a generally rectangular opening 68 preferably having arcuate corners 70 as is well known in this art. The spanking lips 66 may be conventional, each having an end face 72 parallel to the back face 62 of the die member 60 and an inclined face 74 inclined from the end face 72 to the back face 62. However, the spanking lips 66 do not form part of this invention and may be conventional and thus no further description of the spanking lips 66 is required.

A preferred embodiment of the piercing lip or lips 64 for relatively thin metal panels is shown in detail in FIG. 4. The piercing lip 64 includes a planar end face 76, which is preferably parallel to the back face 62 or perpendicular to the axis of the opening 68, a first inclined face 78 inclined from the end face 76 toward the back face 62 and a second inclined face 80 inclined from the first inclined face 78 to adjacent the back face 62. In a preferred embodiment, the second inclined face 80 joins the back face 62 in a large radius or arcuate surface 82. As discussed below, the preferred angle of the first inclined face 78 relative to the end face 76, the width of the first inclined face 78 and the height of the piercing lip 64 measured from the back face 62 will depend upon the thickness of the panel to which the self-attaching female fastener 20 of this invention is attached.

As set forth above, the die member 60 is one of a die set for attaching metal panels to a self-attaching female fastener 20 having different thicknesses. The die member 60A shown in FIG. 4 is generally similar to the die member 60, including a planar end face 76A, which is preferably parallel to the end face 62A, a first inclined face 78A which is inclined from the end face 76A toward the back face 62A and a second inclined face 80A which is inclined from the first inclined face 78A toward the back face 62A and may be joined to the back face 62A in an arcuate surface 82A. As set forth above and discussed further below, the die member 60A is designed for installing a self-attaching female fastener 20 in a metal panel having an intermediate thickness. As will be apparent from a comparison of FIGS. 4 and 5, the width of the first inclined surface 78A of the die button 60A is less than the width of the first inclined face 78 of the die member 60, the second inclined face 80A of the die button 60A is greater than the width of the second inclined face 80 of the die button 60, but the height "h" measured between the back face 62 or 62A and 76 or 76A is generally equal.

The piercing lip 64B shown in FIG. 6 also has generally the same configuration as the piercing lips 64 and 64A, including an end face 76B, generally parallel to the back face 62B or perpendicular to the axis of the opening 68B, a first inclined face 78B inclined from the end face 76B toward the back face 62B and a second inclined face 80B inclined from the first inclined face 78B to adjacent the back face 62B and preferably including an arcuate surface 82B joining the second inclined face 80B to the back face 62B as described above. As set forth above and described further below, the die button 60B is adapted to install a self-attaching female fastener 20 in a metal panel having a greater thickness than the die buttons 60 and 60A. As will be apparent from a comparison of the die button 60B with the die buttons 60A and 60, the width of the first inclined face 78B is less than the widths of the first inclined faces 78A and 78 of the die buttons 60A and 60, respectively, the width of the second inclined face 80B of the die button 60B is greater than the width of the second inclined faces 80A of the die button 60A and the second inclined face 80 of the die button 60. The height "hb" of the piercing lip 64B is preferably greater than the height "h" of the piercing lips 64A and 64.

As will be further understood from the following description of a preferred embodiment of the method of attaching a self-attaching female fastener of this invention with regard to FIGS. 7 to 14, the relative angles, widths and heights of the piercing lips 64, 64A and 64B are important in providing a secure installation of the self-attaching female fastener 20 to panels having a wide range of thicknesses. The preferred angle between the first inclined face (78, 78A and 78B) and the end face (76, 76A and 76B), referred to hereinafter as the "first angle," is preferably between 20 and 50 degrees. However, the first angle is between 20 and 30 degrees or about 25 degrees in the embodiment of the piercing lips 64 and 64A, but the width and length of the first inclined face 78 of the piercing lip 64 is substantially greater than the width and length of the first inclined surface 78A of the piercing lip 64A or nearly double the width and length. The first angle defined by the first inclined face 78B of the piercing lip 64B relative to the end face 76B is preferably between 30 and 50 degrees or about 40 degrees, nearly double the first angle in the embodiments of the piercing lips 64 and 64A and the length and width of the first inclined face 78B is approximately one-half the width and length of the first inclined face 78A. The angle defined between the end face (76, 76A and 76B) and the second inclined face (80, 80A and 80B), referred to hereinafter as the "second angle," is preferably between 60 and 80 degrees or about 70 degrees, but the width and length of the second inclined surface is progressively greater with each of the disclosed embodiments 60, 60A and 60B, respectively. That is, the length and width of the second inclined surface 80A of the piercing lip 64A is greater than the length and width of the second inclined surface 80 of the embodiment of the die member 60 and the length and width of the second inclined surface 80B is greater than 80A of the piercing lips 64. As described above, although a preferred embodiment of the self-attaching female fastener 20 of this invention is formed by rolling, such that the grooves 34 are linear on opposed sides of the pilot portion 22, the self-attaching female fastener of this invention may also be formed by cold header techniques, wherein the groove 34 may be annular, in which case the piercing lips 64, 64A and 64B of the embodiments of the die members 60, 60A and 60B, respectively, would also be annular and configured to be received in the annular groove in the panel support face of the self-attaching female fastener.

Figure 7:
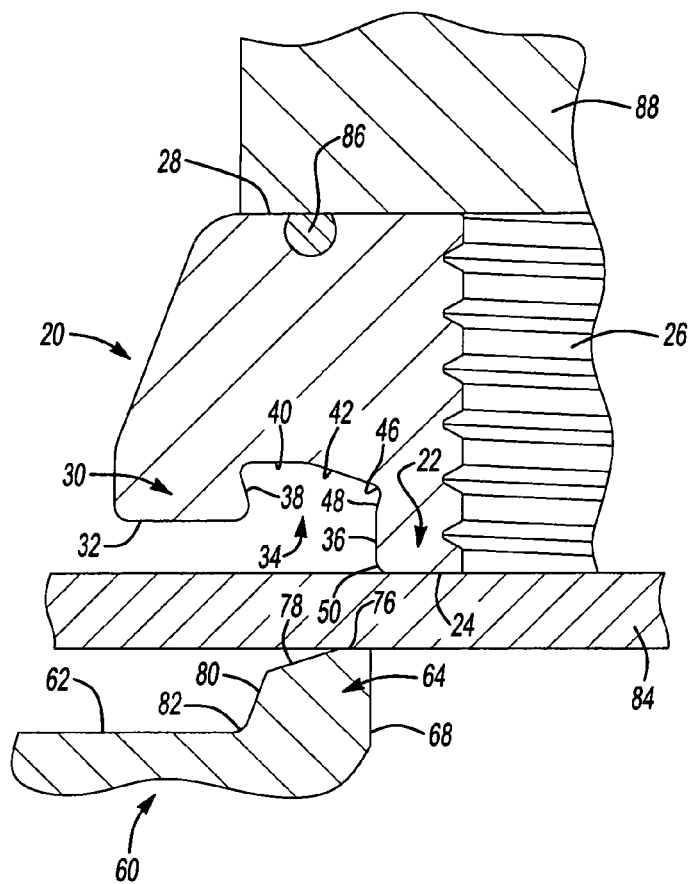
FIG. 7 is a partial side cross-sectional view of the embodiment of the self-attaching female fastener shown in FIGS. 1 and 2 in an installation apparatus with the die button configuration shown in FIGS. 3 and 4.
Figure 8:
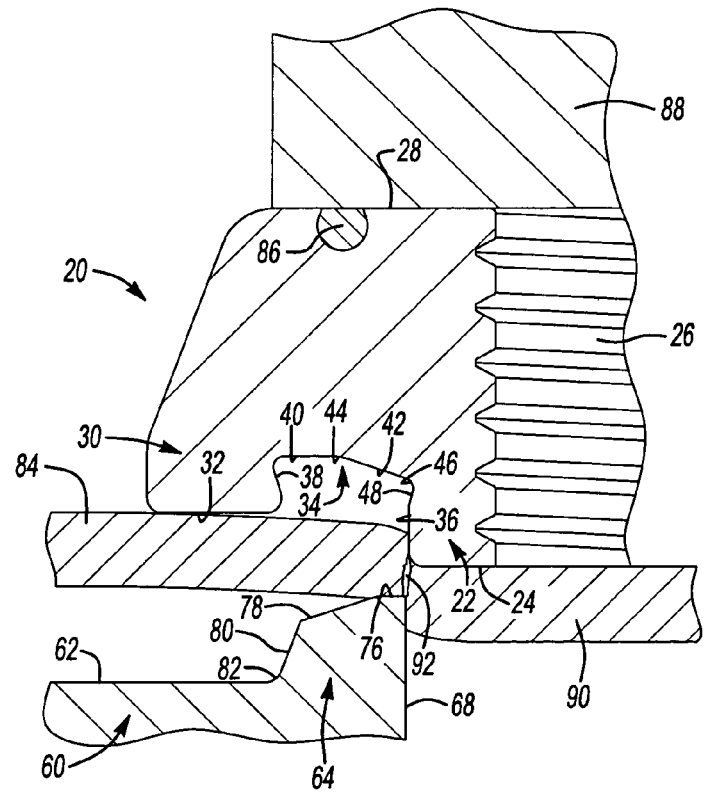
FIG. 8 is a side cross-sectional view similar to FIG. 7 during installation of the self-attaching female fastener of FIGS. 1, 2 and 7 during installation of the self-attaching female fastener in a panel.

FIGS. 7 to 10 illustrate the method of installing the self-attaching female fastener 20 in a panel 84. The female fastener 20 disclosed is interconnected in a continuous strip by frangible wires 86, as disclosed in the above-referenced U.S. Pat. No. 3,711,931. As will be understood by those skilled in this art, self-attaching female fasteners of the type disclosed herein are received in an installation head (not shown) typically attached to the upper die shoe or die platen of a die press (not shown) including a reciprocating plunger 88 which reciprocates through a plunger passage (not shown), wherein the end face of the reciprocating plunger 88 engages the back face 28 of the self-attaching female fastener 20, driving the self-attaching fastener 20 against a panel 84. The die button 60 is typically installed in the lower die shoe or die platen of a die press and the central pilot portion 22 is aligned with the opening 68 through the die button 60 by aligning the plunger passage of the installation head (not shown) with the opening 68 through the die button 60. As shown in FIG. 7, the end face 76 of the die button 60 adjacent the opening 68 is aligned with the inclined second bottom wall portion 42 and the first inclined face 78 is also aligned with the inclined second bottom wall portion 42, but bridges the arcuate surface 44 and first bottom wall portion 40. The second inclined face 80 of the die button 60 is primarily located outside the projection of the groove 34 as shown in FIG. 7, but plays an important part in the installation of the self-attaching female fastener 20 as described further below with regard to FIG. 10. As the plunger 88 is driven against the back face 28 of the self-attaching female fastener 20, the end face 24 is driven against the panel 84, first piercing a slug 90 from the panel, forming an opening 92 through the panel 84 having the same configuration as the end face 24 of the pilot portion 22. The panel 84 is actually pierced by the interaction between the end face 24 of the pilot portion 22 and the end face 76 of the die button 60 adjacent the opening 68 as best shown in FIG. 8. Alternatively, as described above, an opening 92 may be preformed or prepierced through the panel configured to receive the pilot portion 22. The panel support face 32 of the flange portions 30 are then received against the panel 84 and the opening 92 through the panel 84 is received against the outer face 36 of the pilot portion 22 as shown in FIG. 8.

Figure 9:
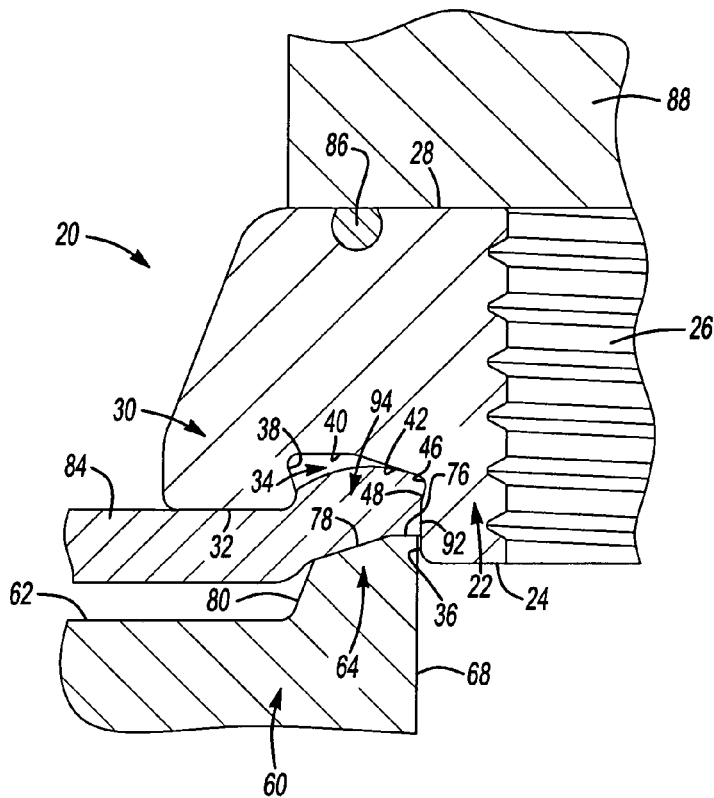
FIG. 9 is a partial side cross-sectional view similar to FIGS. 7 and 8 showing a further step in the sequence of installing the self-attaching female fastener of this invention.
Figure 10:
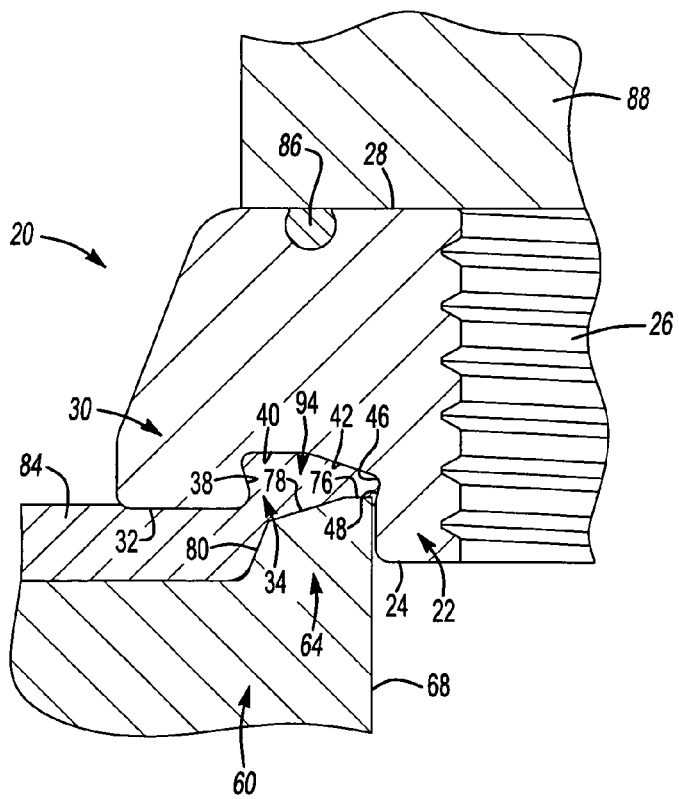
FIG. 10 is a partial cross-sectional view similar to FIGS. 7 to 9 following installation of the self-attaching female fastener in a panel.
Figure 11:
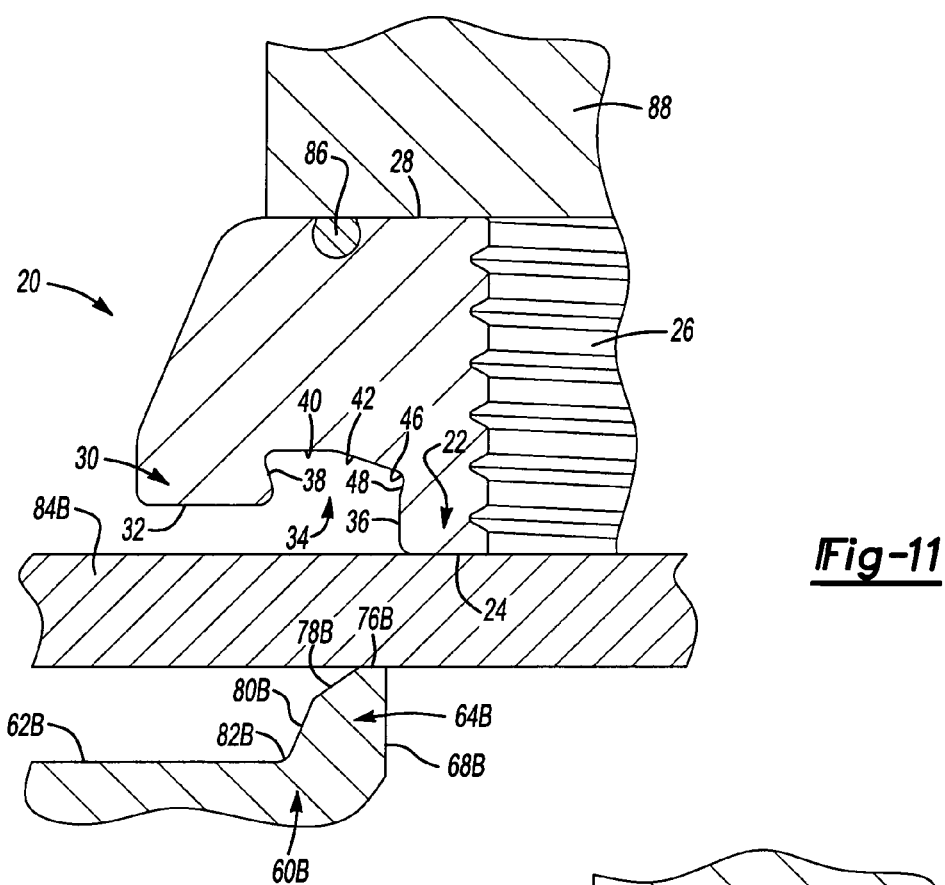
FIG. 11 is a partial side cross-sectional view of the self-attaching female fastener shown in FIGS. 1 and 2 in an installation apparatus including a die button as shown in FIGS. 3 and 6 prior to installation.

As the plunger 88 is driven against the back face 28 of the self-attaching female fastener 20, a panel portion 94 adjacent the pierced panel opening 92 of the panel 84 is driven by the end face 76 and the first inclined face 78 of the die button 60 into the groove 34 and against the second inclined face 42 of the bottom wall of the groove 34 and into the concave arcuate surface 46 and beneath the outwardly inclined face 48 as shown in FIG. 9. The end face 24 and the free end portion of the pilot portion 22 is received into the opening 68 of the die button 60. Finally, the panel portion 94 is deformed outwardly beneath the inclined outer wall 38 forming a mechanical interlock between the panel portion 94 and the self-attaching female fastener 20 as shown in FIG. 10. As shown, the panel support faces 32 of the flange portions 30 are fully seated on the panel 84 and the panel portion 94 is deformed against the first bottom wall portion 40, fully engaging the inclined outer wall 38, substantially filling the groove 34. The end face 24 of the pilot portion 22 is received in the opening 68 of the die member or die button 60 and the second inclined face 80 of the die button 60 thins the panel 84 adjacent the panel support face 32, assuring substantially complete filling of the groove 34.

Figure 12:
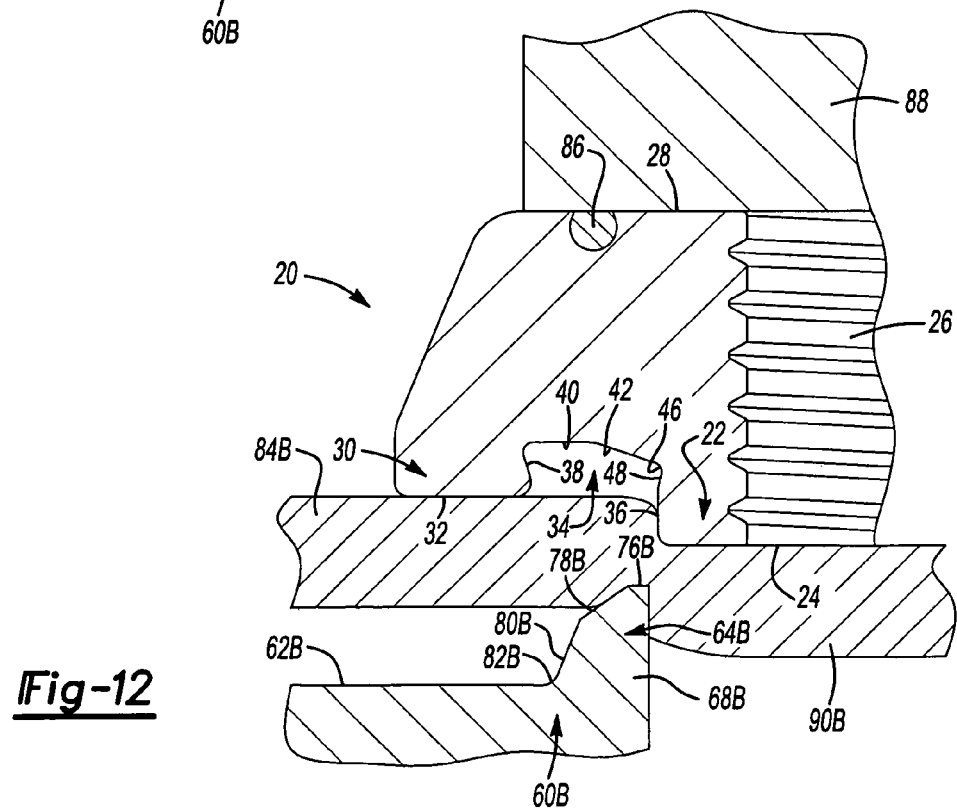
FIG. 12 is a partial side cross-sectional view similar to FIG. 11 during installation of the self-attaching female fastener of this invention in a panel.
Figure 13:
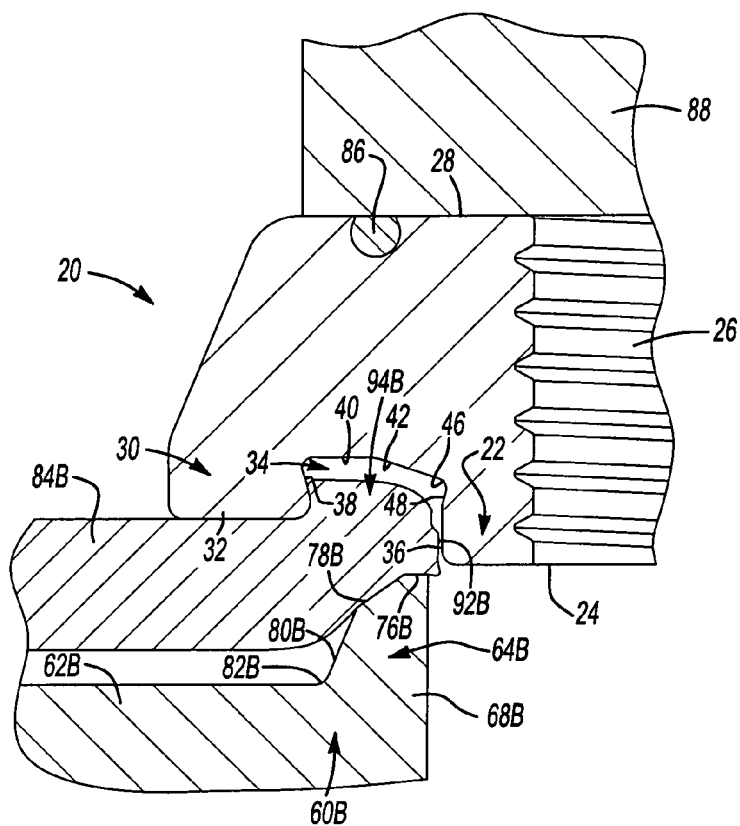
FIG. 13 is a partial side cross-sectional view similar to FIGS. 11 and 12 illustrating a further step in the sequence of installation of the self-attaching female fastener in a panel.
Figure 14:
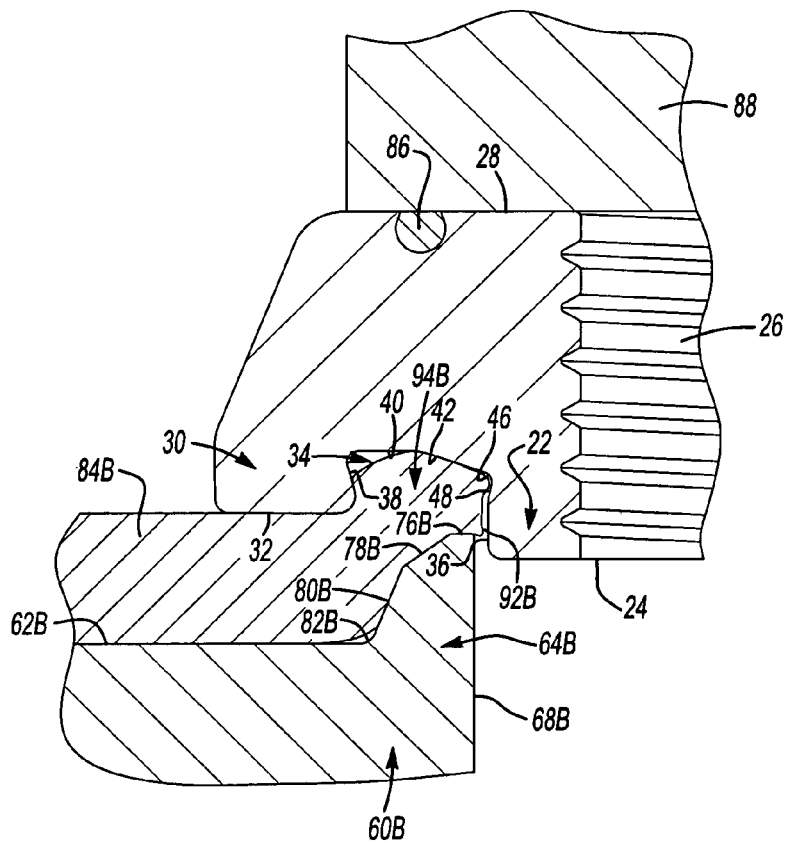
FIG. 14 is a partial side cross-sectional view similar to FIGS. 11 to 13 following installation of the self-attaching female fastener in a panel.

FIGS. 11 to 14 illustrate the installation of the self-attaching female fastener 20 of this invention in a panel 84B having a greater thickness than panel 84 and the die button 60B has a piercing lip 64B as shown in FIG. 6. That is, the pilot portion 22 of the self-attaching female fastener 20 is aligned with the opening 68B through the die button 60B and the self-attaching female fastener 20 is driven by a plunger 88 against the back face 28 of the self-attaching female fastener 20 against a panel 84B. The panel 84B is supported on the end face 76B of the die button 60B as described above with regard to FIG. 7. The plunger 88 then drives the end face 24 of the self-attaching female fastener 20 against the panel, piercing a slug 90B from the panel 84B as illustrated in FIG. 12, although the panel is only partially pierced in FIG. 12. The panel support faces 32 of the flange portions 30 are then driven against the panel 84B, as shown in FIG. 12, driving the planar end face 76B and the first inclined surface 78B into the panel as shown in FIG. 12. As the end face 76B and the first inclined face 78B are driven into the panel, a panel portion 94B adjacent the pierced panel opening 92B is driven into the grooves 34 and eventually against the second inclined bottom wall portion 42 of the groove 34 as shown in FIG. 14, which deforms and drives the panel portion 94B outwardly beneath the inclined outer wall 38 of the groove 34 and into the concave arcuate surface 46 and beneath the outwardly inclined face 48 as shown in FIG. 14. The second inclined face 80B thins the panel portion 94B forming an interlock between the self-attaching female fastener 20 and the panel 84B. As shown in FIG. 14, the panel portion 94B does not completely fill the groove or grooves 34 because of the thickness of the panel 84B. However, the push-off strength or integrity of the mechanical interlock between the self-attaching fastener and the metal panel 84B is excellent, although the panel 84B is beyond the range of a conventional pierce nut as disclosed in the above-referenced U.S. Pat. No. 4,971,499.

As will be understood, the range of panel thicknesses suitable for installation of a self-attaching female fastener of this invention will also depend upon the size of the fastener. For example, a self-attaching female fastener 20 having a 16 mm bore will accommodate greater panel thicknesses than a similar, but smaller fastener having a 6 mm bore. The self-attaching female fastener 20 shown in FIGS. 7 to 14 has a 10 mm bore and the panel thickness 84 in FIGS. 7 to 10 has a thickness of 2 mm. However, the panel 84B shown in FIGS. 11 to 14 has a thickness of 3.3 mm, which is far beyond the range of a conventional self-attaching female fastener as disclosed in the above-referenced U.S. Pat. No. 4,971,499. A self-attaching female fastener as shown at 20 in FIGS. 1 and 2 having a 14 mm or 16 mm diameter bore will accommodate metal panels having a thickness ranging from 2.0 mm to 4.5 mm, compared to a self-attaching female fastener as disclosed in the above-referenced U.S. Pat. No. 5,549,430, wherein the maximum thickness of a metal panel to which the self-attaching female fastener may be installed is less than 2.8 mm or about 2.79 mm, as described above. That is, the self-attaching female fastener and die set of this invention will accommodate a 60% increase in panel thickness.

The self-attaching female fastener, method of installation and die button or die set of this invention thus provides important advantages over the prior art, significantly increasing the applications for this type of fastener. As will be understood, however, various modifications may be made to the invention within the purview of the appended claims. For example, although a preferred embodiment of the self-attaching female fastener of this invention is formed by a rolling process, as described above, the self-attaching female fastener of this invention may also be formed by cold forming or cold heading techniques, wherein the self-attaching female fastener may be generally round, having a cylindrical or oval-shape central pilot portion, a flange portion surrounding or partially surrounding the pilot portion and an annular groove. Having described preferred embodiments of the invention, the invention is now claimed as follows.

The invention claimed is:

1. A method of attaching a self-piercing female fastener to a metal panel, said method comprising the following steps:

forming a self-piercing female fastener including a central pilot portion having a planar end face, a flange portion on opposed sides of said pilot portion having a panel support face generally parallel to said end face of said pilot portion and a groove in said panel support face of said flange portion having an inner side wall defining an outer face of said pilot portion extending generally perpendicular to said end face of said pilot portion from said end face, a bottom wall including a first bottom wall portion adjacent an outer side wall of said groove generally parallel to said pilot end face, a second bottom wall portion adjacent said pilot portion inclined upwardly from said first bottom wall portion to said outer face of said pilot portion, and said outer side wall of said groove inclined inwardly from adjacent said first bottom wall portion toward said outer face of said pilot portion;

supporting a metal panel on a die member having an opening configured to receive said pilot portion and projecting die lips adjacent said opening on opposed sides of said opening, each of said die lips including an end face adjacent said opening extending generally parallel to said end face of said pilot portion and perpendicular to an axis of said opening, a first inclined outer face inclined relative to said end face at an angle of between 20 and 50 degrees and a second inclined face extending from said first inclined face toward a back face of said die member surrounding said die lips;

driving said end face of said pilot portion against said panel, piercing an opening through said panel;

driving said end face of said projecting lips of said die member against panel portions adjacent said opening through said panel into said groove and against said second bottom wall portion; and said end face and said inclined outer surface of said die lips deforming said panel portions against said second bottom wall portion outwardly against said first bottom wall portion and beneath said outer side wall of said groove, thereby forming a mechanical interlock between said self-piercing female fastener and said panel.

2. The method of attaching a self-piercing female fastener to a metal panel as defined in claim 1, wherein said outer face of said pilot portion extends perpendicular to said end face from adjacent said end face to adjacent said second bottom wall portion of said groove and said outer face of said pilot portion including an undercut adjacent said second bottom wall portion, said method including deforming said panel portion against said second bottom wall portion inwardly beneath said undercut.

3. The method of attaching a self-piercing female fastener to a metal panel as defined in claim 2, wherein said undercut includes a concave arcuate surface and an inclined surface extending to said inner side wall, said method including deforming said panel portion against said second bottom wall portion and inwardly into said concave arcuate surface and said inclined surface of said undercut.

4. The method of attaching a self-piercing female fastener to a metal panel as defined in claim 1, wherein said first inclined outer face of said projecting lips is inclined relative to said end face of said die lips at an angle of between 20 and 30 degrees, and said method includes driving said first inclined outer face against said panel portions, deforming said panel portions against said first bottom wall portion of said groove and beneath said outer side walls of said groove.

5. The method of attaching a self-piercing female fastener to a metal panel as defined in claim 1, wherein said first inclined outer face of said die lips is inclined relative to said end face at an angle of between 30 and 50 degrees, and said method includes driving said first inclined outer face against said panel portion, defarming said panel portion against said first bottom wall portion and beneath said outer side walls of said grooves.

6. The method of attaching a self-piercing female fastener to a metal panel as defined in claim 1, wherein said second inclined face of said projecting lips is inclined relative to said end face of said die lips at an angle of between 60 and 80 degrees, and said method includes driving said second inclined face against said panel, thinning said panel adjacent said panel portion.

* * * * *

UNITED STATES PATENT AND TRADEMARK OFFICE
CERTIFICATE OF CORRECTION

| | | |
|---|---|---|
| PATENT NO. | : 7,152,297 B2 | |
| APPLICATION NO. | : 10/858622 | |
| DATED | : December 26, 2006 | |
| INVENTOR(S) | : Harold A. Ladouceur and John J. Vrana | |

It is certified that error appears in the above-identified patent and that said Letters Patent is hereby corrected as shown below:

In column 14, line 23, please delete the word "defarming" and insert the word --deforming--.

Signed and Sealed this

Thirteenth Day of March, 2007

JON W. DUDAS
*Director of the United States Patent and Trademark Office*